(12) United States Patent
Duke

(10) Patent No.: US 8,210,123 B2
(45) Date of Patent: Jul. 3, 2012

(54) TEAT CUP

(76) Inventor: James Richard John Duke, West Sussex (GB)

( * ) Notice: Subject to any disclaimer, the term of this patent is extended or adjusted under 35 U.S.C. 154(b) by 571 days.

(21) Appl. No.: 12/066,889

(22) PCT Filed: Sep. 15, 2006

(86) PCT No.: PCT/GB2006/003455
§ 371 (c)(1),
(2), (4) Date: May 6, 2008

(87) PCT Pub. No.: WO2007/031783
PCT Pub. Date: Mar. 22, 2007

(65) Prior Publication Data
US 2008/0202433 A1 Aug. 28, 2008

(30) Foreign Application Priority Data
Sep. 16, 2005 (GB) .................... 0518976.6

(51) Int. Cl.
*A01J 5/04* (2006.01)
(52) U.S. Cl. .................. 119/14.49; 119/14.47
(58) Field of Classification Search .............. 119/14.47, 119/670, 14.49
See application file for complete search history.

(56) References Cited

U.S. PATENT DOCUMENTS

| | | | |
|---|---|---|---|
| 2,532,088 A | 11/1950 | Cordis | |
| 3,099,246 A * | 7/1963 | Beskow | 119/14.49 |
| 3,696,790 A | 10/1972 | Albright | |
| 3,713,423 A | 1/1973 | Span, Sr. | |
| 4,332,215 A | 6/1982 | Larson | |
| 4,393,811 A * | 7/1983 | Bodmin | 119/14.47 |
| 4,395,971 A | 8/1983 | Happel et al. | |
| 4,498,419 A | 2/1985 | Flocchini | |
| 4,516,530 A | 5/1985 | Reisgies et al. | |
| 4,572,105 A | 2/1986 | Chowdhury et al. | |
| 4,924,809 A | 5/1990 | Berbrugge | |
| 5,386,799 A | 2/1995 | Dietrich | |
| 5,493,995 A * | 2/1996 | Chowdhury | 119/14.54 |
| 5,673,650 A | 10/1997 | Mottram et al. | |
| 5,850,845 A | 12/1998 | Pereira et al. | |

(Continued)

FOREIGN PATENT DOCUMENTS

DE 2 622 794 12/1977

(Continued)

OTHER PUBLICATIONS

International Search Report for International Application No. PCT/GB2006/003455.

(Continued)

*Primary Examiner* — Monica Williams
(74) *Attorney, Agent, or Firm* — Alston & Bird LLP

(57) ABSTRACT

A teat cup comprises a flexible liner (3) for engaging about a teat of an animal to be milked, the liner having a head portion (7), at one end (6), provided with a mouth (9) through which the teat is engageable with the liner, and a milk discharge passageway (12) at the opposite end (5). A nozzle (24) is arranged to discharge fluid into the head portion of the liner, and a fluid delivery tube (21) is connected to the nozzle via a check valve (17) which allows fluid delivery to the nozzle and alleviates the risk of dirt or disinfectant lodging in the nozzle or delivery tube when the teat cup is treated on a jetter at the finish of a milking period.

14 Claims, 2 Drawing Sheets

U.S. PATENT DOCUMENTS

| | | | |
|---|---|---|---|
| 6,098,570 | A | 8/2000 | Aurik et al. |
| 6,234,110 | B1 | 5/2001 | Xavier |
| 6,318,299 | B1 | 11/2001 | Birk |
| 6,321,682 | B1 | 11/2001 | Eriksson et al. |
| 6,435,132 | B1 | 8/2002 | Milbrath et al. |
| 6,550,420 | B1 | 4/2003 | Bjork |
| 6,561,126 | B2 | 5/2003 | Forsen et al. |
| 6,584,930 | B2 * | 7/2003 | Buecker ............... 119/14.02 |
| 6,755,153 | B1 | 6/2004 | Chowdhury |
| 6,935,270 | B2 | 8/2005 | Wipperfurth et al. |
| 6,997,136 | B1 | 2/2006 | Coates |
| 7,178,480 | B2 | 2/2007 | Dahl et al. |
| 7,281,493 | B2 | 10/2007 | Dietrich |
| 7,290,497 | B2 | 11/2007 | Rottier et al. |
| 7,401,573 | B2 * | 7/2008 | Torgerson ............ 119/14.47 |
| 2002/0185071 | A1 | 12/2002 | Guo |
| 2005/0045108 | A1 | 3/2005 | Wipperfurth et al. |
| 2005/0274327 | A1 * | 12/2005 | Johnsson et al. .......... 119/670 |

FOREIGN PATENT DOCUMENTS

| | | | |
|---|---|---|---|
| DE | | 261300 A1 | 10/1988 |
| EP | | 0 277 396 | 8/1988 |
| EP | | 0 527 509 | 2/1993 |
| EP | | 0 543 463 A1 | 5/1993 |
| EP | | 0 728 412 | 8/1996 |
| EP | | 0 801 893 A2 | 10/1997 |
| EP | | 0 945 057 | 9/1999 |
| EP | | 1 790 217 A2 | 5/2007 |
| EP | | 1 795 069 A2 | 6/2007 |
| NL | | 1016237 | 3/2002 |
| WO | WO 01/17337 A1 | | 3/2001 |
| WO | WO 02/23976 A1 | | 3/2002 |
| WO | WO 03/030630 A1 | | 4/2003 |
| WO | WO 03/098998 | | 12/2003 |
| WO | WO 2005/043986 | | 5/2005 |
| WO | WO 2005/072516 A1 | | 8/2005 |
| WO | WO 2005/102035 A2 | | 11/2005 |
| WO | WO 2007/129884 A1 | | 11/2007 |
| WO | WO 2007/129888 A1 | | 11/2007 |

OTHER PUBLICATIONS

Written Opinion for International Application No. PCT/GB2006/003455.

Grindal, R. J. et al., *Automatic Application of Teat Disinfectant Through the Milking Machine Cluster*, Journal of Dairy Research, 56, 1989, pp. 579-585.

Akam, D. N., *The Development of Equipment for the Mechanization of Manual Operations in Machine Milking*, Proceedings of the International Symposium on Machine Milking, 17th Annual Meeting National Mastitis Council, Inc., Feb. 1978, pp. 417-426.

Examination Report issued in connection with European Patent Application No. 05 736 061.2, mailed Jan. 19, 2011.

Thompson, P.D., et al.; "The End-of-Milking Sequence and its Mechanization"; Paper No. 76-3566 Presented at the 1976 Winter Meeting of American Society of Agricultural Engineers; Chicago, Illinois; Dec. 1976; XP008130552; Cover Page and 14 sheets.

* cited by examiner

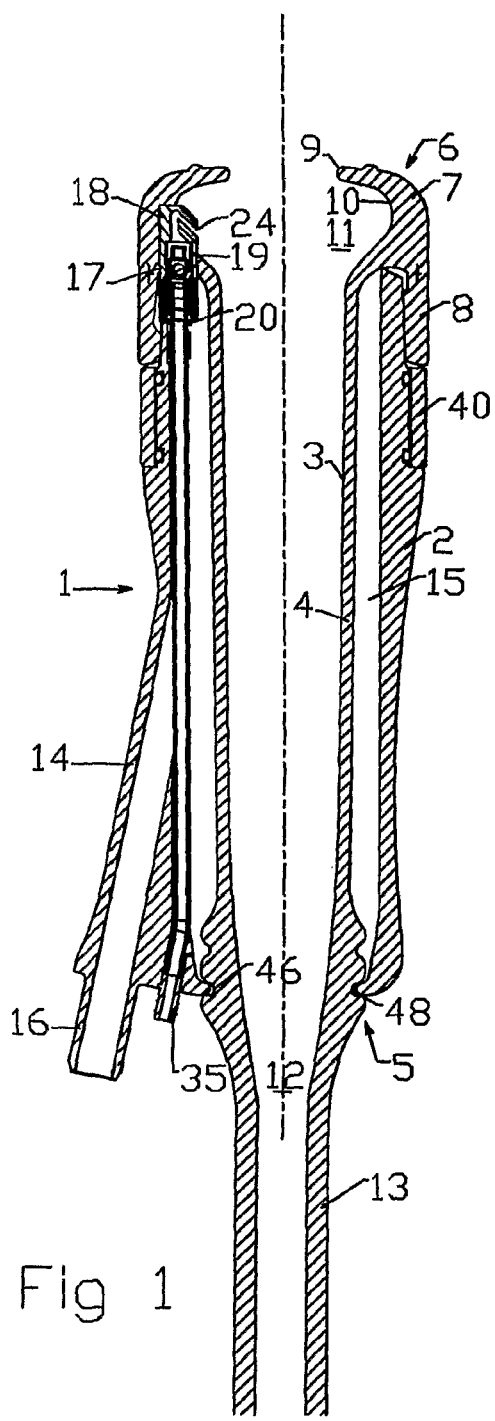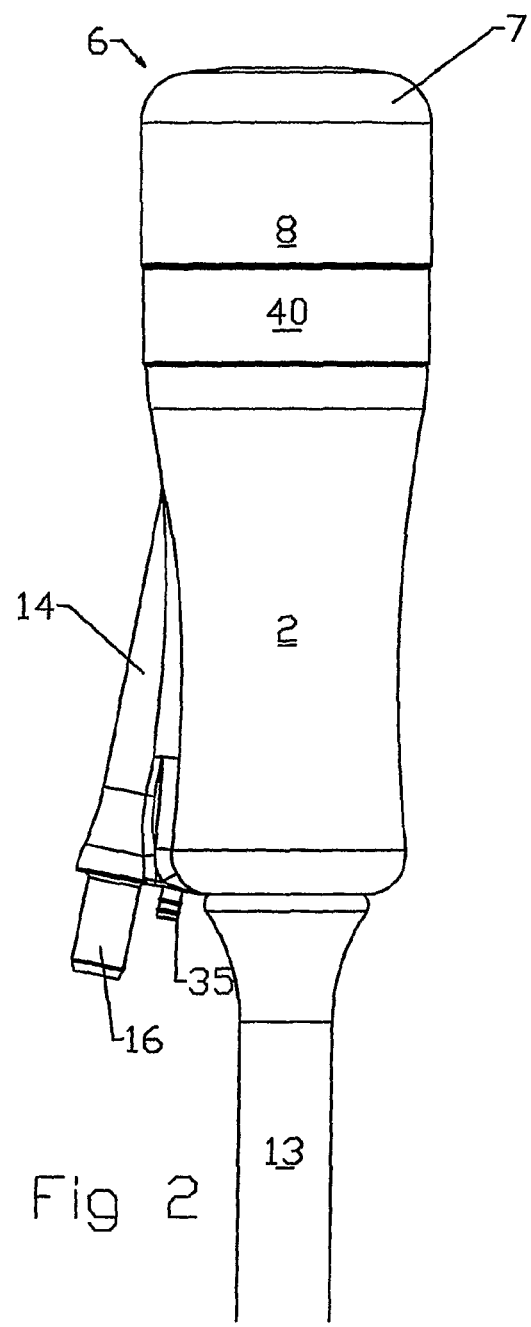

TEAT CUP

BACKGROUND OF THE INVENTION

The present invention relates to teat cups for animal milking equipment and, more particularly, to such teat cups enabling the application of treatment fluids to animal's teats and the teat cups, post milking.

Conventionally, milking equipment installed in a milking parlor comprises a milking point at each animal stall within the parlor. Each milking point includes a milking cluster of teat cups for connecting the equipment to the teats of an animal to be milked. In the case of cows, for example, each milking cluster has four teat cups. Each teat cup comprises a hollow shell supporting a flexible liner which has a barrel portion for engaging about a teat and, at its upper end, has a head portion with a mouth through which the teat is engaged with the barrel of the liner. At the opposite, discharge end of the teat cup, the liner communicates with a flexible, short milk tube connected to a, so called, clawpiece of the cluster where the milk extracted from the animals teats is collected and delivered, via a flexible, long milk tube, to the collection vessel of the equipment.

Upon commencement of milking, a vacuum is applied to the teat cups, via the long milk tube, the clawpiece and the short milk tubes, for the purposes of extracting milk from the teat cups. This vacuum also leaks between the barrel of the liner and the engaged teat and is applied to a void formed about the teat in the head of the liner in order to capture the cup on the teat. Milking is achieved by automatically and alternately applying vacuum and atmospheric pressure pulses to the space between the shell and the liner of each teat cup in order to flex the liner and stimulate discharge of milk from the engaged teat. It is customary to apply these pneumatic pulses either simultaneously to the teat cups of a cluster or alternately to pairs of the teat cups. The clawpiece includes a distributor for distributing the pneumatic pulses to the individual teat cups, via flexible pneumatic lines or tubes.

After milking of an animal is finished, the milking cluster at the milking point is withdrawn from the animal's teats (commonly referred to as "take-off") such as by an automatic cluster remover and, in a cleansing cycle, the teat cups are flushed internally with disinfectant and water and are dried with compressed air preparatory to use on the next animal to be milked. Each teat cup may be fitted with one or more injection nozzles for injecting treatment fluids into the heads of the liners, as described in my copending international application published under the number WO2005/043986. The treatment fluid is fed to the injection nozzles via a distributor of the clawpiece and, upon take-off, the milking cluster is designed to enable the short milk tubes to fall away from the centreline of the cluster so that the teat cups are inverted and hang with their heads downwardly from the clawpiece. Flushing is performed with the teat cups in this inverted position. Consequently liquid can escape through the head portions of the teat cups. The short milk tubes are connected to the clawpiece via spigots which are designed to cause the short milk tubes to be shut off at the spigots when the teat cups fall into their inverted position, so as to avoid entry of treatment fluid into the clawpiece and downstream milk tubes, and consequent contamination of the harvested milk, when the teat cup is back flushed subsequent to the milking of an animal.

Finally, at the end of a milking period, during which several animals may be milked at each milking point, the teat cups of each milking cluster are subjected to disinfecting and washing by a so-called "jetter" ready for use at the next milking period. The jetter is connected to sources of liquid disinfectant detergents and rinsing water and vacuum is applied to the teat cups of a cluster to draw said liquid from the jetter, whilst the teat cups are disposed in an inverted position.

BRIEF SUMMARY OF THE INVENTION

When teat cups having head injection nozzles are treated on a jetter, there is a risk of dirt or disinfectant lodging in a head injection nozzle or delivery tube to the nozzle and one object of the present invention is to alleviate that risk.

Accordingly, from one aspect, the invention consists in a teat cup comprising a flexible liner for engaging about a teat of an animal to be milked, said liner having a head portion, at one end, provided with a mouth through which the teat is engageable with the liner, and a milk discharge passageway at the opposite end, nozzle means arranged to discharge fluid into the head portion of the liner, and a fluid delivery tube connected to the nozzle means via a check valve which allows fluid delivery to the nozzle means and which is mounted in or adjacent the head portion of the liner. The nozzle means may comprise one or more individual nozzles.

In a preferred embodiment, the nozzle means is formed together with the check valve as a unit which is mounted internally of the liner at or adjacent the head portion. The liner of a teat cup requires regular replacing and the installation of the nozzle means and check valve on the liner enables simple replacement of these devices with the liner.

The check valve unit may comprise a moulded plastics body having a passageway at one end defining the nozzle means and arranged to discharge into the head portion of the liner and an inlet at its opposite end for receiving the adjacent end of the delivery tube. In between, the body houses the check valve which may comprise a stainless steel valve ball biased against a seat about an inlet port connected to the body inlet in order normally to close the inlet, the valve seat on the outlet side of the inlet port being in fluid communication with the nozzle passageway. The check valve unit is an interference fit in a preformed cavity in the liner which is typically made from resilient plastics, synthetic resin or silicone.

The delivery tube is preferably mounted internally of the shell and extends from an external inlet port or nipple on the shell adjacent the discharge end of the teat cup to the check valve at the head portion of the liner. The construction may be such that the inlet side of the check valve is engageable with the adjacent end of the delivery tube as the liner is fitted to the shell. The inlet side of the check valve may incorporate suitable sealing means, such as one or more O-ring seals, for sealing the adjacent end of the delivery tube to the inlet of the check valve.

Preferably, the shell is moulded from plastics material and the delivery tube, which may be stainless steel, is disposed in a groove moulded in an internal sidewall of the shell. Advantageously, the delivery tube is substantially housed within the wall of the shell so that the delivery tube does not interfere with the flexing motion of the liner whilst milking with consequent risk of contact between the liner and delivery tube. Moreover, mounting the delivery tube internally of the shell has the advantage of avoiding the necessity of "handing" the teat cups of a milking cluster. Hitherto, where the head injection nozzles of the teat cups have been fed by external flexible delivery tubes, the delivery tubes for teat cups on opposite sides of the cluster have been located in like positions relative to the clawpiece and milking pulse tubes so as to avoid entanglement of the tubes upon take-off and when the teat cups fall into their inverted positions. With an internally mounted delivery tube, the risk of such entanglement is alleviated.

From another aspect, therefore, the invention consists in a teat cup comprising a shell, a flexible liner supported by the shell for engaging about a teat of an animal to be milked, said liner having a head portion, at one end, provided with a mouth through which the teat is engageable with the liner, a milk discharge passageway at the opposite end, nozzle means arranged to discharge fluid into the head portion of the liner, and a delivery tube disposed internally of the shell and extending from an inlet port disposed on the shell adjacent the discharge end of the teat cup for delivering fluid to the nozzle means. Preferably, the delivery tube is engaged in a groove formed along the inside wall of the shell.

Problems can arise during milking owing to the presence, within the head of the liner of a teat cup, of an excessive amount of vacuum used to withdraw, from the cup, milk discharged from the teats. This situation may arise because of the non-uniform nature of animals' teats. Precise liner selection for individual animals is impractical. Excess vacuum in the head of a liner risks the liner creeping up the animal's teats, resulting in restriction of the blood flow within the teat and consequent discomfort, poor milk let down and physical damage to the teat. Also, where the teat cups of a cluster are fitted with injection nozzles for injecting treatment fluids into the heads of the liners, it is desirable to provide check valves in the treatment fluid supply lines to the injection nozzles so as to avoid cross-coupling of the vacuum occurring in the individual head portions of the teat cup liners and excess or insufficient vacuum in the head of one or more teat cups affecting the other teat cups of the cluster.

The present invention may also be used to exercise control over these problems and alleviate them by rating the return spring means of the check valve such that it opens in response to a predetermined pressure differential existing between the vacuum occurring in the head portion of the liner and air pressure in the delivery tube, for example, atmospheric air pressure, to admit air to the head portion of the liner and regulate the vacuum present within the head portion

BRIEF DESCRIPTION OF THE SEVERAL VIEWS OF THE DRAWINGS

In order that the present invention may be more readily understood, reference will now be made to the accompanying drawings, in which:

FIG. 1 is an elevational view of a teat cup embodying the invention;

FIG. 2 is an axial section of the teat cup of FIG. 1; and

DETAILED DESCRIPTION OF THE INVENTION

Figure 3:
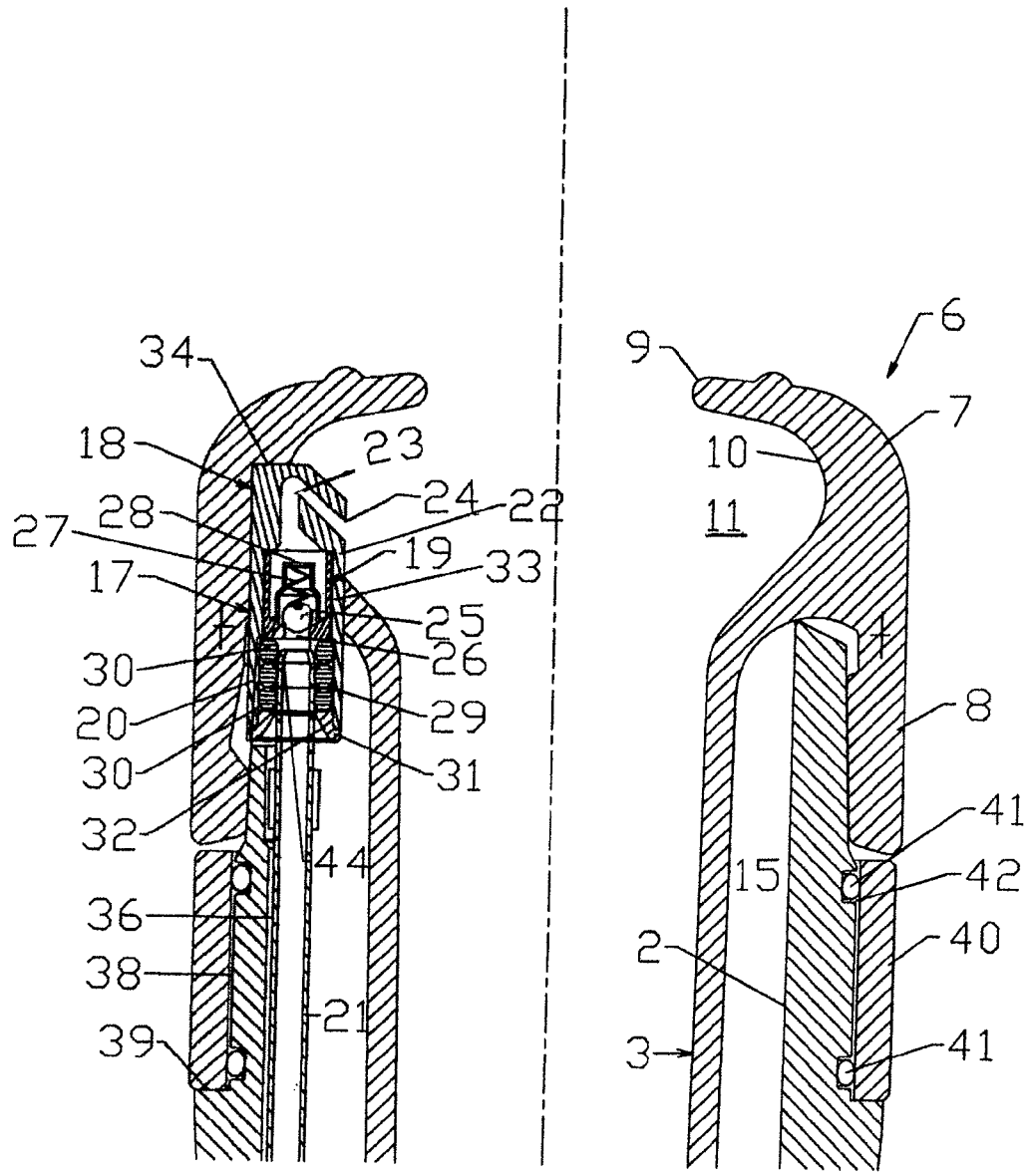
FIG. 3 is an enlarged fragmentary axial section of the head end of the teat cup.

The teat cup illustrated in the accompanying drawings is one of four similar teat cups of a milking cluster used for milking a cow and which is connected to milking equipment. Each teat cup 1 comprises a hollow generally cylindrical shell 2 supporting a flexible liner 3 in spaced relation with the shell. As viewed in FIGS. 1 and 3, the liner has a cylindrical barrel portion 4 sealed to the shell adjacent the bottom, discharge end 5 and adjacent the top or head end 6 of the cup. At the latter end, the liner has a head portion 7 which engages, via a skirt portion 8, about the outside of the shell in order to seal the shell to the head end of the barrel, and which projects above the adjacent end of the shell. The head 7 of the liner is formed with a mouth 9 permitting access to the interior of the liner. Between the top of the barrel 4 of the liner and the mouth 9, the head of the liner is formed with an internal annular cavity 10 which, when an animal's teat is inserted into the cup through the mouth 9, forms a void or space 11 between the side of the teat and the head. At the discharge end 5 of the cup, the liner has a discharge passageway 12 communicating with a flexible, short milk tube 13 which connects the teat cup to a clawpiece (not shown) of the milking cluster and via which vacuum is applied to the inside of the liner for removing, from the cup, milk discharged by the teat during the milking cycle. The shell 2 may be moulded from rigid plastics material whilst the liner 3 may be moulded from resilient plastic, synthetic rubber or silicone.

Integrally moulded with the shell is an inlet tube 14 for connecting the space 15 between the shell 2 and the liner 3, via the clawpiece, to a suitable source for alternately supplying vacuum pulses and venting the space 15 to atmosphere in order to cause the liner to flex against the teat and stimulate milking of an animal to which the teat cup is fitted. The inlet tube has a spigot 16 at its inlet end to which is attached a flexible pipe (not shown) coupling the inlet tube to the clawpiece.

Mounted on the inside of the head portion of the liner is a unit 17 comprising an injection nozzle component 18 for discharging into the cavity 10 in the head portion of the liner, a check valve assembly 19 for controlling delivery of fluid to the injection nozzle, and a coupling 20 for connecting a fluid delivery tube 21 to the unit. The latter comprises a body 22 moulded, for example, from plastics material and having a passageway 23 moulded at its upper end and defining an injection nozzle 24 which is configured so as to direct fluid discharged from the nozzle inwardly and downwardly into the interior of the barrel of the liner, as viewed in FIGS. 1 and 3. The check valve assembly is an interference fit in the body 22 below the nozzle passageway 23 and comprises a spring-loaded valve ball 25 which is urged into contact with a valve seat about an inlet port 26 of the valve by a spiral spring 27. The spiral spring is retained in position by a yoke construction 28 which, when the valve ball 25 is raised off its seat permits fluid to flow about the yoke to the nozzle passageway 23. Below the inlet port, the body has a cavity 29 which houses 0-ring seals 30 which are retained in the cavity by a cap member 31 which may be an interference fit in or bonded to the bottom end of the body 22. The cap member has a funnel shaped inlet opening 32 for receiving the adjacent end of the delivery tube 21 and, when the delivery tube is inserted through this inlet opening the 0-rings seal the end of the delivery tube in the body 22.

The unit 17 may be bonded to or be an interference fit in an aperture 33 in the liner on the inside of the head portion 7. It is prevented from moving upwardly in the head portion by a shoulder 34 adjacent the mouth of the liner and it is also indexed in predetermined alignment with the teat cup.

The nozzle 24 is supplied with fluid, via the check valve 19, by the delivery tube 21 which is mounted internally of the shell 2 and connects a fluid inlet spigot 35 adjacent the discharge end 5 of the teat cup to the inlet of the unit body 22. The fluid inlet spigot 35 is moulded integrally with the shell juxtaposed and on the inside of the inlet passage 14. Downstream of the inlet spigot, the delivery tube snaps into a part-circular groove 36 moulded along the inside wall of the shell 2. The arrangement is such that the radial inner surface of the delivery tube is substantially flush with the inside surface of the shell so as not to interfere with the flexing motion of the liner 3 during milking. The delivery tube is conveniently moulded from stainless steel.

Mounted on the outside of the shell in an annular recess 38 formed between the bottom edge of the skirt 8 and an annular shoulder 39 moulded on the outside of the shell is a cylindrical weight 40 which assists in causing the lightweight plastic teat cups to fall into an inverted position with their heads downwardly upon take-off of the milking cluster. The cylindrical weight 40 is preferably made from stainless steel and is sealed to the outside of the shell by O-rings 41 retained in annular grooves 42 moulded in the outside of the shell.

The construction of the teat cup facilitates its assembly, and replacement of the liner 3 when necessary, and also, replacement of the cylindrical weight 40 to suit specific requirements of milking if more or less weight is required. Hence, the shell 2 is supplied with the delivery tube 21 mounted in the groove 36 along the inside of the shell. On assembly, the appropriate cylindrical weight is mounted about the outside of the shell, over the O-rings 41 and against the moulded shoulder 39 and then the liner is assembled to the shell. The liner 3 is assembled by fitting the discharge end of the liner through the shell 2 from its head end. As the skirt portion 8 of the head of the liner engages about the head end of the shell, the adjacent end of the delivery tube 21 is automatically inserted into the inlet opening of the unit body 22 and is sealed to the body by the O-ring seals 30 housed in the body cavity 29. The inlet end 44 of the delivery tube may be chamfered to facilitate entry into the funnel shaped inlet opening 32 of the body. When the liner is fully fitted in position with an annular groove 46 in the discharge end of the liner engaging the bottom edge 48 of the shell 2, the bottom end of the skirt 8 abuts the upper end of the cylindrical weight 40 so as to retain this firmly in position.

Sanitizing, rinsing and drying fluids, such as disinfecting and conditioning liquid, water and compressed air are supplied to each milking point and milking cluster, from common sources, by a manifold system. At each milking point, a stall control unit incorporating solenoid operated valves selectively supplies the fluids from the manifold system to the teat cups via a distributor mounted on the clawpiece and flexible tubing (not shown) connecting the distributor to the fluid inlet spigots 35. Via the inlet tubes 14, the clawpiece also serves to distribute pneumatic milking pulses derived from suitable sources to the spaces 15 in the teat cups for milking purposes. When the milking of an animal is complete, which is detected by a milk flow meter of the stall control unit as a reduction of milk flow below a predetermined level, an automatic cluster remover is signalled to take off the cluster from the cow's udder and, also, the equipment is signalled to commence the treatment and cleansing cycle. Disinfectant supplied through the delivery tubes 21, into the head portions 7, is firstly injected upon or immediately prior to actuation of the cluster remover so that, as the cups 1 are removed, disinfectant is discharged into each void 11 from the associated nozzle, spreads about the void and is wiped down the outside of each teat, thereby hygienically coating the whole teat with disinfecting liquid. As take-off is completed, the teat cups 1 naturally fall into an inverted position in which they hang downwardly from the short milk tubes, whereafter the control system is actuated so as, for example, sequentially to deliver pulses of water, disinfectant and compressed air to the nozzles 24 in order to sanitize and dry the teat cups. Such sanitizing of teats and teat cups is performed upon completion of the milking of each animal during a milking period. At the end of the milking period, each cluster is thoroughly cleaned and disinfected on a jetter ready for use during the next milking period. Whilst being cleaned on the jetter, the check valve 19 prohibits dirt and cleaning fluid from entering and lodging in the fluid delivery tube.

Moreover, by appropriately rating the spring 27 controlling the valve ball 24, the check valve may also be used, during a milking cycle, to control the degree of vacuum applied to the head 7 of the liner by the vacuum used to withdraw, from the teat cup, milk discharged from the teat. The check valve can be arranged to open when the differential pressure between the vacuum in the cavity 11 and the air in the delivery tube 21 exceeds a predetermined amount so as to admit air to the head portion of the teat cup liner to regulate the vacuum.

The invention claimed is:

1. A flexible teat cup liner for engaging about a teat of an animal to be milked, comprising:
    a barrel portion having an interior;
    a head portion disposed at one end of said liner and provided with a mouth through which the teat is engageable with the interior of said barrel portion, said head portion having an internal annular cavity that is between said mouth and said interior of said barrel portion and that is continuous with said interior of said barrel portion, said cavity, when the animal's teat is inserted into said liner, forming a void between said teat and said head portion internally delimited by a side of said teat;
    a milk discharge passageway at an opposite end of said liner;
    nozzle means arranged to discharge fluid into said internal annular cavity of said head portion of said liner, said nozzle means comprising at least one nozzle within said head portion and that exits into said void, said at least one nozzle being configured to direct fluid discharged from said at least one nozzle inwardly into said void and downwardly into the interior of said barrel portion, whereby said at least one nozzle is enabled to direct fluid into said void for wiping down the outside of the teat, upon takeoff of an associated teat cup, and direct fluid into the liner when said associated teat cup is inverted after take-off; and
    a check valve via which said at least one nozzle is connectable to a fluid delivery tube;
    said check valve being arranged to allow fluid delivery to said at least one nozzle and being mounted in or adjacent said head portion of said liner.

2. A teat cup liner as claimed in claim 1, wherein said at least one nozzle is formed together with said check valve as a unit which is mounted internally of said liner at or adjacent said head portion.

3. A teat cup liner as claimed in claim 2, wherein said unit comprises a body having a passageway at one end defining said at least one nozzle, and an inlet at an opposite end of said body for receiving an adjacent end of said delivery tube, said check valve being housed between said passageway and said inlet.

4. A teat cup liner as claimed in claim 2, wherein said unit is an interference fit in an aperture in said liner.

5. A teat cup liner as claimed in claim 1, wherein said check valve comprises a valve member biased against a seat about an inlet port in order normally to close said inlet port, said valve seat on an outlet side of said inlet port being in fluid communication with said at least one nozzle.

6. A teat cup liner as claimed in claim 1, wherein said check valve incorporates sealing means for sealing an adjacent end of said delivery tube to an inlet of said check valve.

7. A teat cup liner as claimed in claim 1, wherein said check valve includes return spring means rated such that, during a milking operation, said check valve is adapted to open in response to a predetermined fluid pressure differential occurring between vacuum present in said head portion of said liner and air pressure in said delivery tube, thereby to admit air to said head portion and regulate said vacuum present within said head portion.

8. A teat cup for stimulating discharge of milk from an animal's teat in a milking operation, comprising:
a flexible liner for engaging about a teat of an animal to be milked, said flexible liner including a barrel portion having an interior;
a head portion at one end of said flexible liner having a mouth through which said teat is engageable with the interior of said barrel portion, said head portion having an internal annular cavity that is between said mouth and said interior of said barrel portion and that is continuous with said interior of said barrel portion, said cavity, when the animal's teat is inserted into said flexible liner, forming a void between said teat and said head portion internally delimited by a side of said teat;
a milk discharge passageway at an opposite end of said flexible liner;
nozzle means arranged to discharge fluid into said internal annular cavity of said head portion of said flexible liner, said nozzle means comprising at least one nozzle within said head portion and that exits into said void, said at least one nozzle being configured to direct fluid discharged from said at least one nozzle inwardly into said void and downwardly into the interior of said barrel portion, whereby said at least one nozzle is enabled to direct fluid into said void for wiping down the outside of the teat, upon take off of an associated teat cup, and direct fluid into the liner when said associated teat cup is inverted after take-off;
a check valve via which said at least one nozzle is connectable to a fluid delivery tube,
said check valve being arranged to allow fluid delivery to said at least one nozzle and being mounted at said head portion of said flexible liner,
a shell supporting said flexible liner; and
a delivery tube mounted internally of said shell and extending from an external inlet port on said shell to said check valve at said head portion of said flexible liner.

9. A teat cup as claimed in claim 8, wherein said check valve is engageable with the adjacent end of said delivery tube as said flexible liner is fitted to said shell.

10. A teat cup as claimed in claim 8, wherein said delivery tube is disposed in a groove formed in an internal sidewall of said shell.

11. A teat cup as claimed in claim 8, wherein said shell is moulded from plastics material.

12. A teat cup as claimed in claim 11, wherein said external inlet port for said delivery tube comprises an inlet spigot moulded integrally with said shell.

13. A teat cup as claimed in claim 8, including an annular weight mounted on an outside of said shell for assisting said teat cup to fall into an inverted position upon take-off.

14. A teat cup as claimed in claim 13 wherein said annular weight is disposed on said shell adjacent said head portion of said liner.

* * * * *